United States Patent [19]

Scheinert

[11] Patent Number: 4,776,033
[45] Date of Patent: Oct. 4, 1988

[54] SELECTIVE CALLING AND DIALING ARRANGEMENT FOR A MOBILE RADIO STATION IN A RADIO TRANSMISSION SYSTEM

[75] Inventor: Stefan Scheinert, Geldrop, Netherlands

[73] Assignee: U.S. Philips Corporation, New York, N.Y.

[21] Appl. No.: 63,543

[22] Filed: Jun. 17, 1987

Related U.S. Application Data

[63] Continuation of Ser. No. 769,785, Aug. 23, 1985, abandoned.

[30] Foreign Application Priority Data

Aug. 25, 1984 [DE] Fed. Rep. of Germany ....... 3431302

[51] Int. Cl.[4] .............................................. H04B 1/38
[52] U.S. Cl. ...................................... 455/31; 455/33; 455/54; 455/89
[58] Field of Search .................. 455/31, 33, 77, 89, 455/54; 379/58, 63

[56] References Cited

U.S. PATENT DOCUMENTS

| 4,434,661 | 2/1984 | Puhl | 455/33 |
| 4,486,624 | 12/1984 | Puhl et al. | 455/77 |
| 4,545,071 | 10/1985 | Freeburg | 455/33 |

FOREIGN PATENT DOCUMENTS

2927885 1/1981 Fed. Rep. of Germany.

Primary Examiner—Michael A. Masinick
Attorney, Agent, or Firm—David R. Treacy

[57] ABSTRACT

The selective calling and dialling arrangement of a mobile radio station forms radio telegrams addressed to a specific subscriber, interprets received pulse telegrams and controls a radio device and a control device arranged in the mobile radio station. To that end the selective calling and dialling arrangement comprises a first store in which constants identifying a specific country are stored, a program store, a data store and a microprocessor. Commands and system constants are stored in the program store. For subsequent changes in such system constants without the necessity of changing the program stored in the program store, the system constants are stored in a second store, which is connected to the microprocessor via an input/output arrangement.

2 Claims, 2 Drawing Sheets

SELECTIVE CALLING AND DIALING ARRANGEMENT FOR A MOBILE RADIO STATION IN A RADIO TRANSMISSION SYSTEM

This is a continuation of application Ser. No. 769,785, filed Aug. 23, 1985, now abandoned.

BACKGROUND OF THE INVENTION

1. Field of the Invention

The invention relates to a selective calling and dialling arrangement for a mobile radio station in a radio transmission system.

2. Description of the Prior Art

A selective calling and dialling arrangement, that produces radio telegrams addressed to a specific person, is described in TE KA DE Technische Mitteilungen 1980, pages 10 to 14, more specifically pages 12 and 13. The selective calling and dialling arrangement described in the German document is shown in FIG. 1, and is provided in a radio telephony set which together with radio device FG and operating device BG forms part of the mobile radio station. The radio telegrams are transmitted via the radio device FG. This selective arrangement interprets received pulse telegrams and controls both the radio device FG and also the indicator of the control device BG. In addition, the selective calling and dialling arrangement interprets the keyboard information fed into the control device BG.

The selective calling and dialling arrangement comprises a microprocessor CPU which is connected via data, address and control busses (omnibus system) to stores (PSP, DSP RSP, KSP and SP1) to a counting circuit (T) and to an input/output arrangement (E/A). To render addressing of the stores (PSP, DSP), the counter circuit (T) and the input/output arrangement (E/A) possible, the selective calling and dialling arrangement includes an address decoder (not shown). The program for the microprocessor CPU is stored in a program store PSP which is in the form of a read-only memory. The selective calling and dialling arrangement comprises a data store DSP for storing variable data which are, for example, required during the program flow.

The calling number memory or store RSP and the identification store KSP provide the necessary data for transmitting a called party's number, based on a called party code entered via the keyboard of the control device BG, and recognizing received calls which are intended for this subscriber or station.

Those of ordinary skill in the radio telecommunications art will recognize the typical flow of signals and the major circuit or function sections. For example, the demodulator section DEM for incoming data is shown, while the corresponding modulator section for outgoing (transmitted) traffic is not shown separately.

Constants which define specific countries, for example call channel numbers, search tuning ranges and the maximum channel command, which is connected to the input/output arrangement E/A, are stored in a first store SP1 of the selective calling and dialling arrangement. By shifting country-specific constants from the program store PSP to the first store SP1, the number of programs for different countries can be kept very low.

In the standard specifications of the different operators of radio transmission systems, system constants such as, for example, the number of radio reports to be transmitted, dialling tones, indications, HF and jitter thresholds, number of repetitions or periods for supervision, are fixed and stored in the program store PSP. These system constants are set non-recurrently before the radio transmission system is made operative and can only be changed at great cost and effort during operation. The manufacturers of mobile radio stations include the predetermined system constants somewhere in each developed program, so that changing the system constants is similar to a change in the program stored in the program store PSP. In the TE KA DE Technische Mitteilungen 1980 it is disclosed to store constants which differ from country to country not in the program store PSP but in the additional store SP1.

3. Other Developments German Offenlegungsschrift No. 33 14 557, Published Oct. 25, 1984, proposes a transmission and receiver arrangement for radio telephony which comprises a store which is capable of being programmed with subscriber-specific parameters, and a microcomputer assigned to this store. This provides the user with the possibility to make a selection from sets of predetermined parameters. This makes it possible for the user to select the output characteristics he desires, also without special technical knowledge. This selection is comparable to the way described in TE KA DE Technische Mitteilungen 1980 for selecting between sets of system constants which differ from country to country. Adapting the transmission and receive arrangements when the sets of parameters are changed requires the replacement of the microcomputer itself. This replacement is necessary because of the then necessary change in the program.

SUMMARY OF THE INVENTION

The object of the invention is to configure a selective calling and dialling arrangement such that a subsequent change of system constants does not result in a change in the program stored in the program store.

In accordance with the invention, an arrangement otherwise similar to that disclosed in the TE KA DE publication described above, may be readily up-dated to operate with new system constants by storing these system constants in a second store, rather than incorporating them in the program. This second store is accessed via the input/output arrangement and may be readily updated by replacing this store only.

The invention is based on the recognition that in contradistinction to the prior art selective calling and dialling arrangements a possibility to change system constants can be provided by shifting these system constants to a second store. The above-mentioned publication does not contain any suggestion in respect of this. The selective calling and dialling arrangement according to the invention has the advantage that an interface having uniform interface conditions occurs between store SP2 and the input/output arrangement E/A. As a result thereof it is for the first time possible for an operator of a radio transmission system to change the system constants during operation, without the need for the manufacturer of mobile radio stations to change the program stored in the program store PSP or to replace the microcomputer itself.

DESCRIPTION OF THE PREFERRED EMBODIMENT

Figure 1:
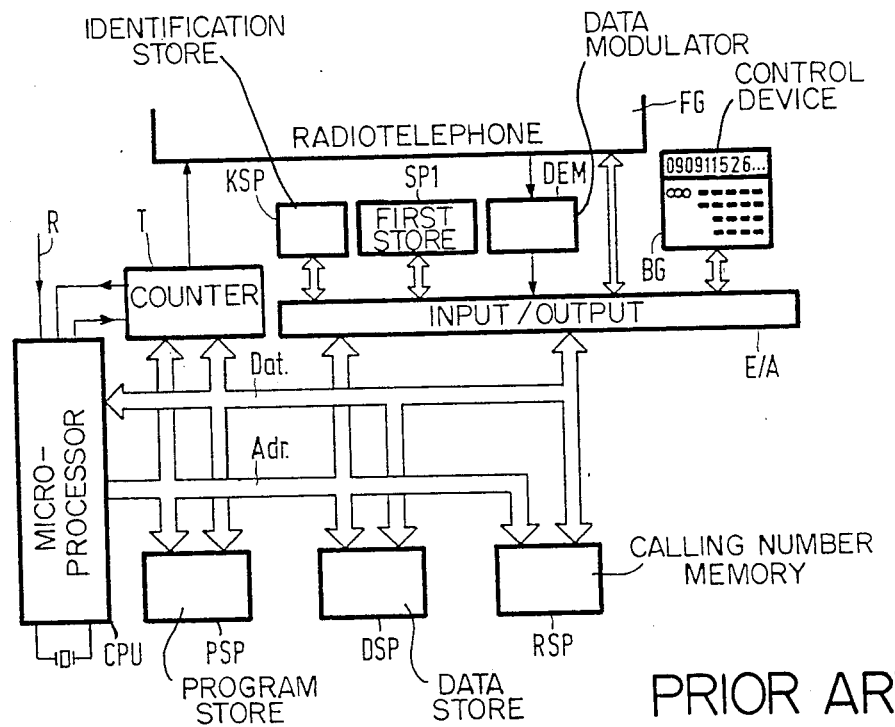
FIG. 1 is a block diagram of the prior art arrangement described in the TE KA DE publication.
Figure 2:
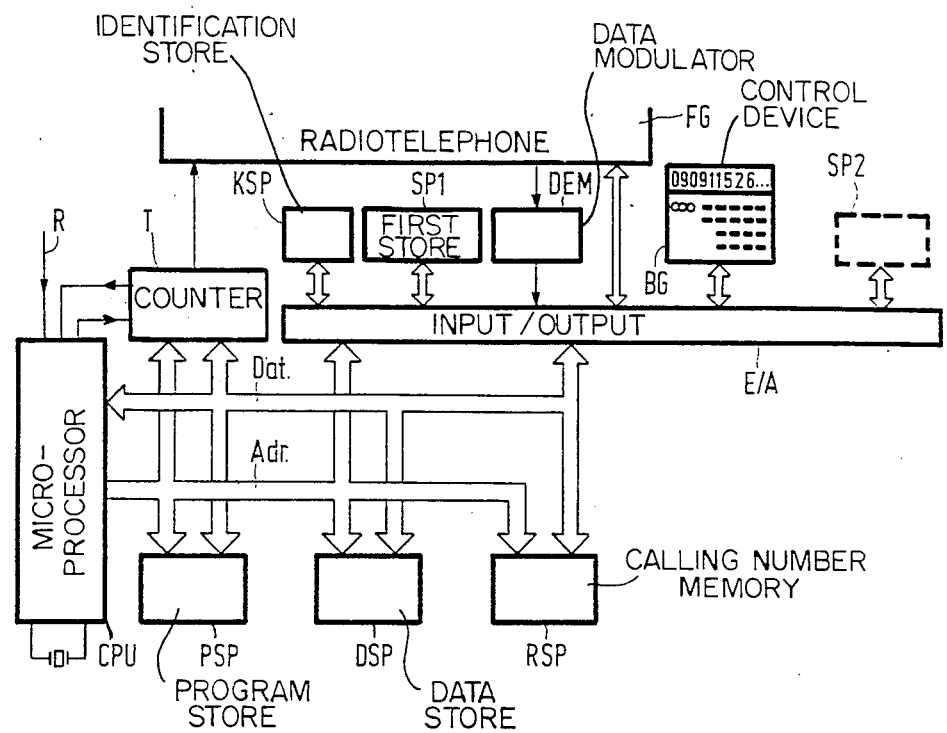
FIG. 2 is a block diagram of the arrangement according to the invention, the added store being shown in dashed lines.

When FIG. 2 is compared with FIG. 1, the selective calling and dialling arrangement according to the invention only requires an additional second store SP2, which is shown by means of broken lines in the drawing. In the second store SP2 the system constants, particularly the number of radio reports to be transmitted, dialling tones, indications, number of repetitions, HF and jitter thresholds and supervising periods are shown. Should it be necessary to change these system constants, this can be effected later on by replacing the second store SP2, without the need for replacing the program store. The microprocessor CPU accesses by means of the input/output arrangement E/A the system constants stored in the second store SP2 and effects the system flow in dependence on the program stored in the program store PSP.

In a further embodiment of the invention an identification store KSP arranged in the selective calling and dialling arrangement can be combined with the second store SP2 to form one single store, so that the operator of the radio transmission system can make new assignments in a simple way by replacing this store. By storing the number and identification of the mobile subscriber in this store the additional identification store KSP can be omitted.

In a further embodiment according to the invention output characteristics for the mobile radio station are also stored in the second store SP2 in addition to the system constants. This provides the possibility to limit, for example, given services to predetermined areas of the radio transmission system. This feature is also available to a user of the transmission and receiver arrangement in accordance with the Offenlegungsschrift No. 33 14 557, insofar the output characteristics in the sets of subscriber-specific parameters are present.

What we claimed is:

1. A selective calling and dialling arrangement for a mobile radio station in a radio transmission system, comprising a first store (SP1), a program store (PSP), a data store (DSP), a microprocessor (CPU), and an input/output arrangement (E/A) interconnecting said stores and said microprocessor; wherein said input/output arrangement accesses constants stored in said first store (SP1) and identifying a specific country, and processes these constants in accordance with a program stored in said program store (PSP), characterized in that system constants selected for values for a number of reports to be transmitted, dialling tones, indications, HF and jitter thresholds, number of repetitions or periods for supervision are stored in a second store (SP2) and that the second store (SP2) is connected to the input/output arrangement (E/A).

2. A selective calling and dialling arrangement as claimed in claim 1, characterized in that the identification and output characteristics for the mobile radio station are stored in the second store (SP2).

* * * * *